US010173656B2

(12) United States Patent
Inoue

(10) Patent No.: US 10,173,656 B2
(45) Date of Patent: Jan. 8, 2019

(54) NEGATIVE PRESSURE TYPE BOOSTER DEVICE

(71) Applicant: ADVICS CO., LTD., Kariya-shi, Aichi-ken (JP)

(72) Inventor: Yoji Inoue, Toyoake (JP)

(73) Assignee: ADVICS CO., LTD., Kariya-Shi, Aichi-Ken (JP)

( * ) Notice: Subject to any disclaimer, the term of this patent is extended or adjusted under 35 U.S.C. 154(b) by 261 days.

(21) Appl. No.: 15/031,979

(22) PCT Filed: Oct. 24, 2014

(86) PCT No.: PCT/JP2014/078320
§ 371 (c)(1),
(2) Date: Apr. 25, 2016

(87) PCT Pub. No.: WO2015/060420
PCT Pub. Date: Apr. 30, 2015

(65) Prior Publication Data
US 2016/0272182 A1 Sep. 22, 2016

(30) Foreign Application Priority Data

Oct. 25, 2013 (JP) ................................. 2013-222091

(51) Int. Cl.
B60T 13/569 (2006.01)
(52) U.S. Cl.
CPC .................................. B60T 13/569 (2013.01)
(58) Field of Classification Search
CPC ..................................................... B60T 13/569
(Continued)

(56) References Cited

U.S. PATENT DOCUMENTS 5,704,270 A 1/1998 Tsubouchi
6,739,676 B1 * 5/2004 Isono ..................... B60T 8/365
188/356

(Continued)

FOREIGN PATENT DOCUMENTS

JP 3528321 B2 5/2004
JP 2009-502602 A 1/2009

OTHER PUBLICATIONS

International Search Report (PCT/ISA/210) dated Jan. 13, 2015, by the Japanese Patent Office as the International Searching Authority for International Application No. PCT/JP2014/078320.
(Continued)

Primary Examiner — Thomas E Lazo
Assistant Examiner — Daniel S Collins
(74) Attorney, Agent, or Firm — Buchanan Ingersoll & Rooney PC

(57) ABSTRACT

A movable diaphragm of a negative pressure type booster device includes an annular rubber diaphragm and an annular metal plate. The diaphragm is airtightly pinched by the housing at an annular outer peripheral bead portion formed at an outer peripheral edge of the diaphragm, and airtightly secured to an outer peripheral portion of a valve body, together with an inner peripheral portion of the plate, at an annular inner peripheral bead portion formed at an inner peripheral edge of the diaphragm. Between the outer peripheral bead portion and the inner peripheral bead portion, there are formed a folded portion having a curved portion toward the front and continuous with the outer peripheral bead portion at an outer peripheral area, and an annular portion continuous with an inner peripheral area of the folded portion and with the inner peripheral bead portion.

4 Claims, 2 Drawing Sheets

(58) Field of Classification Search
USPC .................................................. 92/96, 98 D
See application file for complete search history.

(56) References Cited

U.S. PATENT DOCUMENTS

2004/0118275 A1   6/2004  Wake
2008/0202327 A1   8/2008  Faller et al.

OTHER PUBLICATIONS

Written Opinion (PCT/ISA/237) dated Jan. 13, 2015, by the Japanese Patent Office as the International Searching Authority for International Application No. PCT/JP2014/078320.

* cited by examiner (a)

(b)

(c)

(d)

(e)

NEGATIVE PRESSURE TYPE BOOSTER DEVICE

TECHNICAL FIELD

The present invention relates to a negative pressure type booster device serving as one constituent part of a brake device applied to an automobile.

BACKGROUND ART

A general negative pressure type booster device is configured such that a valve body connected to a movable diaphragm partitioning an interior of a housing into a forward negative pressure chamber and a rear pressure conversion chamber has a shaft hole, a plunger which can be reciprocated in an axial direction with reference to the valve body and moves integrally with an input member and an a valve mechanism including a negative pressure valve performing communication/cutoff between the negative pressure chamber and the pressure conversion chamber depending on reciprocal movement of the plunger with reference to the valve body and an air valve performing communication/cutoff between the pressure conversion chamber and atmospheric air are built in the shaft hole, a reaction member having a rear surface with which a front end portion of the plunger and a front end portion of the valve body can be engaged and an output member having a rear end portion engaged with a front surface of the reaction member and being capable of moving in an axial direction with reference to the valve body are mounted, and the movable diaphragm and the valve body operate with an operation of the input member to operate the output member. The negative pressure type booster device is described in, for example, Japanese Patent No. 3528321.

In the negative pressure type booster device described in Japanese Patent No. 3528321, the movable diaphragm includes an annular rubber diaphragm and an annular metal plate disposed in front thereof, the rubber diaphragm is airtightly held at an annular outer peripheral bead portion formed on an outer peripheral edge of the diaphragm in a housing, and is airtightly fixed on an outer peripheral portion of the valve body together with an inner peripheral portion of the plate on an annular inner peripheral bead portion formed on an inner peripheral edge of the diaphragm. In the rubber diaphragm, between the outer peripheral bead portion and the inner peripheral bead portion, a folded portion having a curved portion on the front side and connected to the outer peripheral bead portion at an outer peripheral portion is formed, and an annular portion connected to an inner peripheral portion of the folded portion and the inner peripheral bead portion is formed.

SUMMARY OF INVENTION

A negative pressure type booster device of this type employs a configuration in which the annular portion of the rubber diaphragm is in contact with a metal plate and the folded portion of the rubber diaphragm is not in contact with the metal plate. Extension of the device caused by a differential pressure generated in an active state is larger in the folded portion of the rubber diaphragm than in the annular portion of the rubber diaphragm. The rubber diaphragm is generally molded in a condition (0%-active condition) in which the shape of the folded portion is a shape in an inactive state. For this reason, the folded portion of the rubber diaphragm extends in any active state, and is disadvantageous to durability. Thus, as the rubber diaphragm, an expensive rubber material having high durability is used.

The present invention has been made to solve the above problems (i.e., durability of the folded portion in the rubber diaphragm is improved to make, for example, an inexpensive rubber material having low durability in the rubber diaphragm usable).

A negative pressure type booster device is configured such that a valve body connected to a movable diaphragm partitioning an interior of a housing into a forward negative pressure chamber and a rear pressure conversion chamber has a shaft hole, a plunger which can be reciprocated in an axial direction with reference to the valve body and moves integrally with an input member and an a valve mechanism including a negative pressure valve performing communication/cutoff between the negative pressure chamber and the pressure conversion chamber depending on reciprocal movement of the plunger with reference to the valve body and an air valve performing communication/cutoff between the pressure conversion chamber and atmospheric air are built in the shaft hole, a reaction member having a rear surface with which a front end portion of the plunger and a front end portion of the valve body can be engaged and an output member having a rear end portion engaged with a front surface of the reaction member and being capable of moving in an axial direction with reference to the valve body are mounted, and the movable diaphragm and the valve body operate with an operation of the input member to operate the output member, wherein the movable diaphragm includes an annular rubber diaphragm and an annular metal plate disposed in front thereof, the rubber diaphragm is airtightly held at an annular outer peripheral bead portion formed on an outer peripheral edge of the diaphragm in the housing, and is airtightly fixed on an outer peripheral portion of the valve body together with an inner peripheral portion of the metal plate on an annular inner peripheral bead portion formed on an inner peripheral edge of the diaphragm, between the outer peripheral bead portion and the inner peripheral bead portion, a folded portion having a curved portion on the front side and connected to the outer peripheral bead portion at an outer peripheral portion is formed, an annular portion connected to an inner peripheral portion of the folded portion and the inner peripheral bead portion is formed, and the rubber diaphragm is molded in a condition in which a shape of the folded portion is a form in an active state.

In the negative pressure type booster device according to the present invention, since the rubber diaphragm is molded in the condition in which the shape of the folded portion is a shape in an active state, in any active condition (active condition in which the shape of the folded portion is a shape in a molding state), the folded portion of the rubber diaphragm, which is loaded with a differential pressure, is hard to extend. In an inactive state of the negative pressure type booster device, the folded portion of the rubber diaphragm, which is curved in comparison with a shape in the molding condition, is not loaded with a differential pressure. In this manner, the durability of the folded portion in the rubber diaphragm can be improved, the durability of the negative pressure type booster device can be improved, or an inexpensive rubber material having low durability can be used in the rubber diaphragm.

In the implementation of the present invention, when a condition of the folded portion in an inactive state of the valve body is a 0%-active condition and a condition of the folded portion in a full-stroke active state of the valve body is a 100%-active condition, a molded shape of the rubber diaphragm is desired to be a shape in any one of the active conditions including the 10%-active condition to the 100%-active condition of the folded portion. In this case, since an operation region (less-than-10%-active condition) in which a differential pressure acting on the folded portion is low is removed from an operation region in which the molded shape of the rubber diaphragm is set, improvement of durability can be effectively obtained.

In the implementation of the present invention, when a condition of the folded portion in an inactive state of the valve body is a 0%-active condition and a condition of the folded portion in a full-stroke active state of the valve body is a 100%-active condition, a molded shape of the rubber diaphragm is desired to be a shape in any one of the active conditions including the 10%-active condition to the 70%-active condition of the folded portion. In this case, since an operation region (less-than-10%-active condition) in which a differential pressure acting on the folded portion is low and an operation region (over-70%-active condition) in which assembling property is deteriorated is removed from an operation region in which the molded shape of the rubber diaphragm is set, improvement of durability and securing of assembling property can be effectively obtained.

In the implementation of the present invention, in the rubber diaphragm, the outer peripheral bead portion is desired to be mounted in the housing when the folded portion has a shape in a molding condition. Before the outer peripheral bead portion is mounted in the housing, the valve body is desired to be moved forward by a predetermined distance from an inactive position in a condition in which the inner peripheral bead portion of the rubber diaphragm is airtightly fixed to an outer periphery of the valve body together with an inner periphery of the metal plate. In this case, the outer peripheral bead portion can be easily mounted in the housing without deforming the outer peripheral bead portion.

DISCRIPTION OF EMBODIMENTS

Figure 1:
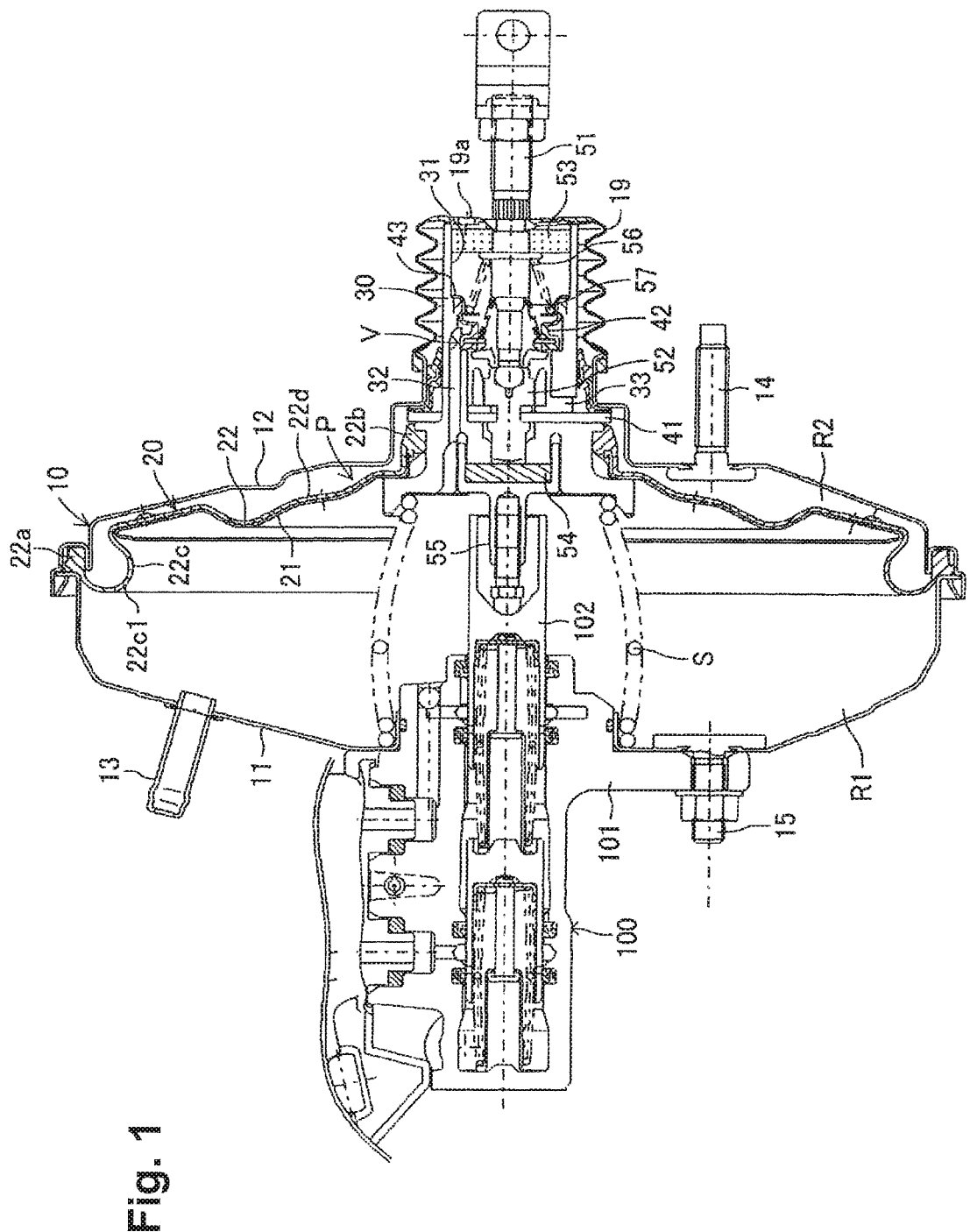
FIG. 1 is a vertical side sectional view showing an embodiment of a negative pressure type booster device according to the present invention.

Embodiments of the present invention will be described below with reference to the accompanying drawings. FIG. 1 shows an embodiment of a negative pressure type booster device according to the present invention. In the negative pressure type booster device according to the embodiment, a power piston P including a movable diaphragm 20 and a valve body 30 in a housing 10 is mounted movably in forward and backward directions (left and right directions in FIG. 1), and the interior of the housing 10 is partitioned into a forward negative pressure chamber R1 and a rear pressure conversion chamber R2 by the movable diaphragm 20.

The housing 10 includes a forward shell 11 and a rear shell 12, and includes a negative pressure feed pipe 13 airtightly disposed in the forward shell 11 to cause a negative pressure chamber R1 to always communicate with a negative pressure source (for example, an intake manifold of an engine (not shown)). This housing 10 is fixed to a stationary member, i.e., a vehicle body (not shown) with a plurality of mounting bolts 14 airtightly penetrating the rear shell 12, and a brake master cylinder 100 is supported with a plurality of mounting bolts 15 airtightly penetrating the forward shell 11.

The brake master cylinder 100, which is a known brake master cylinder, is airtightly mounted in the forward shell 11 at a rear end portion of the cylinder body 101. A piston 102 of the brake master cylinder 100 projects from a cylinder body 101 to the rear side and protrudes into the negative pressure chamber R1 and is pressed and moved forward by a distal end portion (not shown) of an output shaft 55 (will be described later).

The movable diaphragm 20 of the power piston P includes an annular metal plate 21 and an annular rubber diaphragm 22, and is installed to be movable in forward and backward directions (axial directions of the power piston P) in the housing 10. The diaphragm 22 is airtightly held at an annular outer peripheral bead portion 22a formed on the outer peripheral edge thereof in the housing 10. The diaphragm 22 is airtightly fixed to the outer periphery of the valve body 30 together with the inner periphery of the plate 21 at an annular inner peripheral bead portion 22b formed on the inner peripheral edge of the diaphragm 22.

The valve body 30 of the power piston P, which is a resin hollow body connected to the inner periphery of the movable diaphragm 20, is airtightly mounted in the rear shell 12 of the housing 10 at an intermediate portion cylindrically formed such that the valve body 30 can be moved in forward and backward directions (axial directions of the power piston P) and biased backward with a return spring S interposed between the rear shell 12 and the forward shell 11 of the housing 10. A portion projecting outside the housing 10 of the valve body 30 is covered and protected with a boot 19 having a plurality of vent holes 19a formed in the rear end thereof.

In the valve body 30, a stepped shaft hole 31 penetrating the valve body 30 in the forward and backward directions is formed, one pair of (only one is shown in FIG. 1) negative pressure communicating paths 32 having a rear end communicating with an intermediate step of the shaft hole 31 and a front end communicating with the negative pressure chamber R1 and a key attaching hole 33 which is approximately orthogonal to the front portion of the shaft hole 31 and into which a key member 41 can be inserted from the outer periphery are formed.

In the shaft hole 31, an input shaft 51 and a plunger 52 are coaxially mounted, and a valve mechanism V and a filter 53 are coaxially mounted. In the shaft hole 31, in front of the plunger 52, a rubber reaction member 54 and an output shaft (output member) 55 are coaxially mounted.

The input shaft 51 can be reciprocated with reference to the valve body 30, coupled to an acceptable connecting portion of the plunger 52 at a spherical end portion in the form of a joint, coupled to a brake pedal (not shown) at a rear-end screw portion through a yoke, an receives force on pedal acting on the brake pedal as an input toward the front. The input shaft 51 is engaged with a return spring 56 through a retainer locked on the intermediate step thereof and biased by the return spring 56 toward the rear.

The plunger 52 can be brought into contact with a central portion of a rear surface of a reaction member 54 at the distal end of the plunger and engaged with the key member 41 on an annular groove portion formed in the intermediate portion of the plunger, and has a distal end portion partially receiving reaction force of an output from the reaction member 54. At the rear end of the plunger 52, an annular air valve seat on the valve mechanism V is formed.

The reaction member 54, a central portion of the rear surface of which can be swollen and deformed backward, is housed in a rear cylindrical portion of the output shaft 55 and is engaged (brought into contact) with the rear surface of the rear end portion of the output shaft 55 on the entire front surface. In this state, the reaction member 54 is mounted on the front end portion of the valve body 30 together with the rear cylinder portion of the output shaft 55. The reaction member 54 has a rear surface which can be brought into contact with the front surface of the distal end portion of the plunger 52, and is brought into contact with an annular front end face of the valve body 30.

The output shaft 55 is mounted in the front end portion of the shaft hole 31 of the valve body 30 together with the reaction member 54 such that the output shaft 55 can be moved in the forward and backward directions, and has a distal end portion which is in contact with an engagement portion (concave portion) of the piston 102 in the brake master cylinder 100 such that the output shaft 55 can be moved by pressing. In a braking operating, reaction force received from the piston 102 of the brake master cylinder 100 is transmitted to the reaction member 54.

The key member 41 has a function of regulating forward and backward movement of the plunger 52 with reference to the valve body 30 of the power piston P and a function of regulating a movable limit position (rear return position of the valve body 30) of the power piston P backward with reference to the housing 10. The key member 41 is mounted to be relatively movable by a predetermined distance in the axial direction of the power piston P with reference to both the valve body 30 and the plunger 52.

The valve mechanism V includes an arc-like or circular negative pressure valve seat formed integrally with the rear end portion of the negative pressure communicating paths 32 in the valve body 30, an annular air valve seat formed integrally with the rear end portion of the plunger 52, and a cylindrical valve body 42 disposed coaxially with the air valve seat and mounted in the shaft hole 31 of the valve body 30. The valve body 42 has an annular attaching portion and a cylindrical movable portion formed integrally with the attaching portion and being capable of moving in the axial direction.

The attaching portion of the valve body 42 is airtightly mounted in the shaft hole 31 of the valve body 30 and fixed and held at a predetermined position (step) of the shaft hole 31 in the valve body 30 with a retainer 43. The retainer 43 is biased forward with the return spring 56 and fixed to the step of the shaft hole 31 in the valve body 30.

The movable portion of the valve body 42 has a negative pressure valve unit constituting a negative pressure valve being capable of setting on/leaving from the negative pressure valve seat and performing communication/cutoff between the negative pressure chamber R1 and the pressure conversion chamber R2 with the negative pressure valve seat, and an annular air valve unit constituting an air valve being capable of setting on/leaving from the air valve seat and performing communication/cutoff between the pressure conversion chamber R2 and atmospheric air with the air valve seat. The movable portion is biased forward with a compression spring 57.

The configuration of the valve mechanism V allows the pressure conversion chamber R2 to communicate with the negative pressure chamber R1 or atmospheric air depending on forward and backward movements of the input shaft 51 and the plunger 52 with reference to the valve body 30. More specifically, the input shaft 51 and the plunger 52 move forward from original positions (return inactive position) in FIG. 1 with reference to the valve body 30, the negative pressure valve unit sets on the negative pressure valve seat, and the air valve seat leaves from the air valve unit. In this case, the communication between the pressure conversion chamber R2 and the negative pressure chamber R1 is cut off to allow the pressure conversion chamber R2 to communicate with atmospheric air. At this time, atmospheric air flows into the pressure conversion chamber R2 through the vent holes 19a of the boot 19, the filter 53, the interior of the valve body 42, a gap between the air valve seat and the air valve unit, a communication path formed in the valve body 30, and the like. Thus, in the embodiment, the movable diaphragm 20 and the valve body 30 operate forward with a forward operation of the input shaft 51, and the output shaft 55 operates forward.

In a condition in which the input shaft 51 and the plunger 52 return to a return inactive position (original position) with respect to the valve body 30, the air valve seat sets on the air valve unit, and the negative pressure valve unit leaves from the negative pressure valve seat (i.e., a condition in which the air valve is closed, communication between the pressure conversion chamber R2 and atmospheric air is cut off, and the negative pressure valve opens to communicate the negative pressure chamber R1 with the pressure conversion chamber R2), the communication between the pressure conversion chamber R2 and atmospheric air is cut off to allow the pressure conversion chamber R2 to communicate with the negative pressure chamber R1. At this time, air is sucked and flows from the pressure conversion chamber R2 to the negative pressure chamber R1 through the communication path formed in the valve body 30, the gap between the negative pressure valve unit and the negative pressure valve seat, the negative pressure communicating paths 32, and the like. Thus, in the embodiment, the movable diaphragm 20 and the valve body 30 operate backward with a backward operation of the input shaft 51, and the output shaft 55 operates backward.

In the embodiment, the rubber diaphragm 22 is airtightly held at the annular outer peripheral bead portion 22a formed on the outer peripheral edge thereof in the housing 10, and airtightly fixed on the outer periphery of the valve body 30 together with the inner periphery of the plate 21 on the annular inner peripheral bead portion 22b formed on the inner peripheral edge of the diaphragm 22, and a folded portion 22c and an annular portion 22d are formed between the outer peripheral bead portion 22a and the inner peripheral bead portion 22b.

Figure 2:
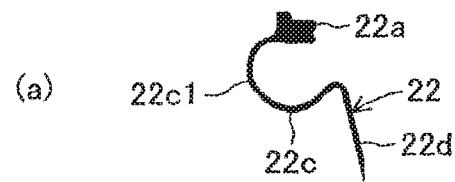
FIG. 2 is a partially sectional view schematically showing each active condition of a diaphragm shown in FIG. 1.
Figure 2:
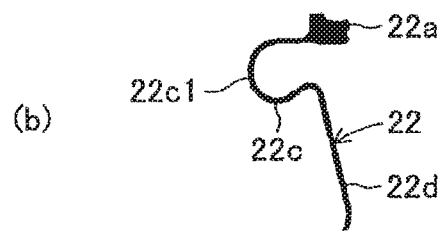
Figure 2:
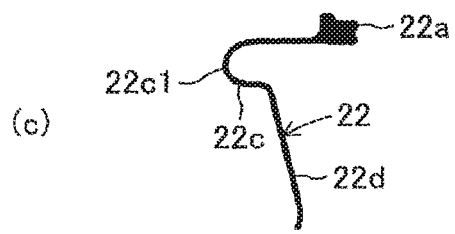
Figure 2:
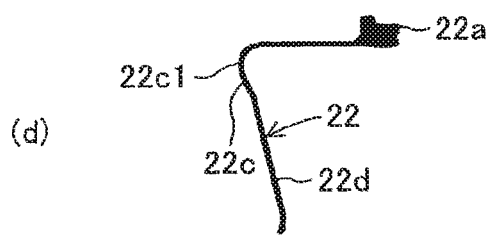
Figure 2:
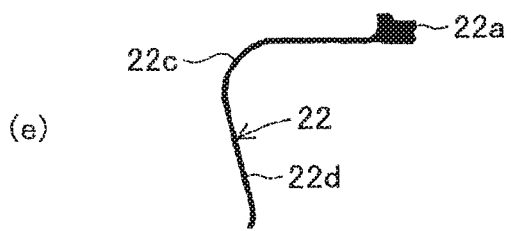

The folded portion 22c has a curved portion 22c1 in front thereof, and is connected to the outer peripheral bead portion 22a at the outer peripheral portion. The annular portion 22d is connected to the inner peripheral portion of the folded portion 22c and the inner peripheral bead portion 22b. The rubber diaphragm 22 is molded in a condition (active condition in FIG. 2(c)) in which the shape of the folded portion 22c is a shape in an active state. In the active condition in FIG. 2(c), when the condition of the folded portion 22c in an inactive state of the valve body 30 is set to a 0%-active condition (active condition in FIG. 2(a)) and the condition of the folded portion 22c in a full-stroke active state of the valve body 30 is set to a 100%-active condition (active condition in FIG. 2(e)), a 50%-active condition is obtained. An active condition in FIG. 2(b) is a 25%-active condition, and an active condition in FIG. 2(d) is a 75%-active condition.

In the negative pressure type booster device according to the embodiment configured as described above, the rubber diaphragm 22 is molded in a condition in which the shape of the folded portion 22c is a shape in the 50%-active condition (in operation). For this reason, in the 50%-active condition (active condition in which the shape of the folded portion 22c is a shape in molding), the folded portion 22c of the diaphragm 22, which is loaded with a differential pressure, is hard to extend. In an inactive state (condition in FIG. 1) of the negative pressure type booster device, the folded portion 22c of the diaphragm 22, which is curved and deformed in comparison with a shape in the molding condition, is not loaded with a differential pressure. In this manner, the durability of the folded portion 22c in the diaphragm 22 can be improved, the durability of the negative pressure type booster device can be improved, or an inexpensive rubber material having low durability can be used in the diaphragm 22.

In the negative pressure type booster device according to the embodiment, the folded portion 22c of the diaphragm 22 has the shape in the molding condition, and the outer peripheral bead portion 22a is mounted on the housing 10. Before the outer peripheral bead portion 22a is mounted in the housing 10, the valve body 30 is moved forward by a predetermined distance from an inactive position in a condition in which the inner peripheral bead portion 22b of the diaphragm 22 is airtightly fixed to the outer periphery of the valve body 30 together with the inner periphery of the plate 21. The diaphragm 22 is held in the condition shown in FIG. 2 (c). For this reason, the outer peripheral bead portion 22a can be easily mounted in the housing 10 without vainly deforming the outer peripheral bead portion 22a.

In the embodiment, the rubber diaphragm 22 is molded in a condition in which the shape of the folded portion 22c is a shape in the 50%-active condition (in operation). However, in the embodiment of the present invention, the rubber diaphragm 22 need only be molded in the condition in which the shape of the folded portion 22c is the shape in operation, for example, the rubber diaphragm 22 can be molded in a condition in which the shape of the folded portion 22c is a shape in any one of the active conditions including the 10%-active condition to the 100%-active condition, or the rubber diaphragm 22 can also be molded in a condition in which the shape of the folded portion 22c is a shape in any one of the active conditions including the 10%-active condition to the 70%-active condition. In these cases, in the diaphragm 22, the folded portion 22c has the shape in the molding condition, and assembling work for outer peripheral bead portion 22a on the housing 10 can also be performed.

When the rubber diaphragm 22 is molded in the condition in which the shape of the folded portion 22c is a shape in any one of the active conditions including the 10%-active condition to the 100%-active condition, since an operation region (less-than-10%-active condition) in which a differential pressure acting on the folded portion 22c is low is removed from an operation region in which the molded shape of the diaphragm 22 is set, improvement of durability can be effectively obtained. When the rubber diaphragm 22 is molded in the condition in which the shape of the folded portion 22c is a shape in any one of the active conditions including the 10%-active condition to the 70%-active condition, since an operation region (less-than-10%-active condition) in which a differential pressure acting on the folded portion 22c is low and an operation region (over-70%-active condition) in which assembling property is deteriorated are removed from an operation region in which the molded shape of the diaphragm 22 is set, improvement of durability and securing of assembling property can be effectively obtained.

In the embodiment, the present invention is applied to a single negative pressure type booster device. However, for example, the present invention can also be applied to a tandem negative pressure type booster device in the same manner as that in the embodiments described above or while being appropriately changed, and is not limited to the embodiments.

The invention claimed is:

1. A negative pressure type booster device comprising:
   a housing,
   a movable diaphragm partitioning an interior of the housing into a forward negative pressure chamber and a rear pressure conversion chamber,
   a valve body connected to the movable diaphragm, the valve body including a shaft hole,
   a plunger configured to reciprocate in an axial direction with reference to the valve body and movable integrally with an input member,
   a valve mechanism movable integrally with the plunger, the valve mechanism including a negative pressure valve performing communication/cutoff between the negative pressure chamber and the pressure conversion chamber depending on reciprocal movement of the plunger with reference to the valve body and an air valve performing communication/cutoff between the pressure conversion chamber and atmospheric air, the negative pressure valve and the air valve being positioned in the shaft hole,
   a reaction member having a rear surface engageable with a front end portion of the plunger and a front end portion of the valve body, and
   an output member having a rear end portion engaged with a front surface of the reaction member and being configured to move in the axial direction with reference to the valve body, the movable diaphragm and the valve body being operable upon operation of the input member in a forward direction to move the output member in the forward direction, wherein
   the movable diaphragm includes an annular rubber diaphragm and an annular metal plate disposed in front thereof, the rubber diaphragm is airtightly held at an annular outer peripheral bead portion formed on an outer peripheral edge of the diaphragm in the housing, and is airtightly fixed on an outer peripheral portion of the valve body together with an inner peripheral portion of the metal plate on an annular inner peripheral bead portion formed on an inner peripheral edge of the diaphragm, between the outer peripheral bead portion and the inner peripheral bead portion, a folded portion having a curved portion on the front side and connected to the outer peripheral bead portion at an outer peripheral portion is formed, an annular portion connected to an inner peripheral portion of the folded portion and the inner peripheral bead portion is formed, and the rubber diaphragm is molded in a condition in which a shape of the folded portion is a form which the folded portion also takes in an active state of the valve body.

2. The negative pressure type booster device according to claim 1, wherein when a condition of the folded portion in an inactive state of the valve body is a 0%-active condition and a condition of the folded portion in a full-stroke active state of the valve body is a 100%-active condition, a molded shape of the rubber diaphragm is a shape in any one of the active conditions including the 10%-active condition to the 100%-active condition of the folded portion.

3. The negative pressure type booster device according to claim 1, wherein when a condition of the folded portion in an inactive state of the valve body is a 0%-active condition and a condition of the folded portion in a full-stroke active state of the valve body is a 100%-active condition, a molded shape of the rubber diaphragm is a shape in any one of the active conditions including the 10%-active condition to the 70%-active condition of the folded portion.

4. The negative pressure type booster device according to claim 1, wherein in the rubber diaphragm, the outer peripheral bead portion is mounted in the housing when the folded portion has a shape in a molding condition.

\* \* \* \* \*